(12) United States Patent
Fabrega Sanchez et al.

(10) Patent No.: US 11,749,894 B2
(45) Date of Patent: Sep. 5, 2023

(54) MULTI-LAYER PATCH ANTENNA

(71) Applicant: QUALCOMM Incorporated, San Diego, CA (US)

(72) Inventors: Jorge Fabrega Sanchez, San Diego, CA (US); Alireza Mohammadian, San Diego, CA (US); Mohammad Ali Tassoudji, San Diego, CA (US); Assaf Haviv, Carlsbad, CA (US)

(73) Assignee: QUALCOMM Incorprated, San Diego, CA (US)

( * ) Notice: Subject to any disclaimer, the term of this patent is extended or adjusted under 35 U.S.C. 154(b) by 0 days.

(21) Appl. No.: 17/685,670

(22) Filed: Mar. 3, 2022

(65) Prior Publication Data
US 2022/0224013 A1    Jul. 14, 2022

Related U.S. Application Data

(63) Continuation of application No. 16/147,232, filed on Sep. 28, 2018, now Pat. No. 11,296,415.

(51) Int. Cl.
*H01Q 1/24* (2006.01)
*H01Q 9/04* (2006.01)
*H01Q 5/378* (2015.01)
*H01Q 21/06* (2006.01)
*H04B 1/04* (2006.01)

(52) U.S. Cl.
CPC ........... *H01Q 9/0414* (2013.01); *H01Q 1/243* (2013.01); *H01Q 5/378* (2015.01); *H01Q 9/0464* (2013.01); *H01Q 21/065* (2013.01); *H04B 1/0458* (2013.01)

(58) Field of Classification Search
CPC .... H01Q 21/065; H01Q 9/0464; H01Q 1/243; H01Q 5/378; H01Q 9/0414
See application file for complete search history.

(56) References Cited

U.S. PATENT DOCUMENTS

| | | |
|---|---|---|
| 6,133,882 A | 10/2000 | LaFleur et al. |
| 6,937,206 B2 | 8/2005 | Puente et al. |
| 8,269,687 B2 | 9/2012 | Lindmark et al. |
| 9,368,860 B2 | 6/2016 | Hossain |
| 9,831,566 B2 | 11/2017 | Delestre et al. |
| 11,139,588 B2 | 10/2021 | Edwards et al. |

(Continued)

OTHER PUBLICATIONS

Hsieh T.H., et al., "Design of Dual-Frequency Circularly-Polarized Slot Antennas with Switchable Frequency", Sep. 2010, pp. 1-4.

(Continued)

*Primary Examiner* — Graham P Smith
(74) *Attorney, Agent, or Firm* — QUALCOMM INCORPORATED (57) ABSTRACT

An antenna system includes: a patch radiator being electrically conductive and configured to radiate energy in a first frequency band and a second frequency band, different from the first frequency band; a parasitic patch radiator overlapping with the patch radiator, the parasitic patch radiator being electrically conductive and being configured to radiate energy in the first frequency band; and at least one parasitic element including a conductor sized and disposed relative to the parasitic patch radiator such that a combination of the parasitic patch radiator and the at least one parasitic element will radiate energy in the second frequency band.

24 Claims, 9 Drawing Sheets

(56) References Cited

U.S. PATENT DOCUMENTS

| | | |
|---|---|---|
| 11,296,415 B2 | 4/2022 | Fabrega Sanchez et al. |
| 2002/0183013 A1 | 12/2002 | Auckland et al. |
| 2007/0296635 A1 | 12/2007 | Popugaev et al. |
| 2009/0135078 A1 | 5/2009 | Lindmark et al. |
| 2014/0073337 A1 | 3/2014 | Hong et al. |
| 2017/0012359 A1 | 1/2017 | Jung et al. |
| 2017/0125895 A1 | 5/2017 | Baks et al. |
| 2017/0229784 A1 | 8/2017 | Kitamura et al. |
| 2018/0123245 A1 | 5/2018 | Papio Toda et al. |
| 2020/0021037 A1 | 1/2020 | Wu et al. |

OTHER PUBLICATIONS

International Search Report and Written Opinion—PCT/US2019/050966—ISA/EPO—dated Nov. 27, 2019.

Jilani S.F., et al., "Planar Millimeter-Wave Antenna on Low-Cost Flexible PET Substrate for 5G Applications", IEEE 10th European Conference on Antennas and Propagation (EuCAP), 2016, pp. 1-3.

Kumar G., et al., "Broadband Microstrip Antennas" In: "Broadband Microstrip Antennas", Jan. 1, 2003 (Jan. 1, 2003), Artech House, Norwood, MA, USA, XP055337084, ISBN: 978-1-58053-244-0 pp. 1-407, pp. 171-pp. 202; figures 5.12, 5.15, 5,6,8,9.

Li G., et al., "A Low-Profile Dual-Polarized Patch Antenna with Bandwidth Enhanced by Stacked Parasitic Elements", 2018 International Conference on Microwave and Millimeter Wave Technology (ICMMT), IEEE, May 7, 2018 (May 7, 2018), pp. 1-3, XP033465045, DOI: 10.1109/ICMMT.2018.8563348.

Ngom A., et al., "A Reconfigurable Beam Dual Polarized Microstrip Cross Patch Antenna", IEEE Conference Publication, Mar. 19-24, 2017, pp. 1-2.

Osman A.S., et al., "Modeling of Multiband/Wideband Stack Series Array Antenna Configuration for 5G Application", International Conference on Computer and Communication Engineering, 2016, pp. 349-354.

Wang H., et al., "Design of a Dual-Polarized Patch Array for Millimeter-Wave Applications", IEEE, 2016, 4 pages.

Yoo S., et al., "Design of Microstrip Patch Antennas with Parasitic Elements for Minimized Polarization Mismatch", IEEE, Aug. 21-25, 2016, pp. 1-3.

Zhai W., et al., "Dual-Band Millimeter-Wave Interleaved Antenna Array Exploiting Low-Cost PCB Technology for High Speed 5G Communication", IEEE MTT-S International Microwave Symposium (IMS), 2016, 4 Pages.

MULTI-LAYER PATCH ANTENNA

The present Application for patent is a continuation of patent application Ser. No. 16/147,232 entitled "MULTI-LAYER PATCH ANTENNA" filed Sep. 28, 2018, pending, and assigned to the assignee hereof and hereby expressly incorporated by reference herein.

BACKGROUND

Wireless communication devices are increasingly popular and increasingly complex. For example, mobile telecommunication devices have progressed from simple phones, to smart phones with multiple communication capabilities (e.g., multiple cellular communication protocols, Wi-Fi, BLUETOOTH® and other short-range communication protocols), supercomputing processors, cameras, etc. Wireless communication devices have antennas to support wireless communication over a range of frequencies.

As wireless communication technology evolves from, mobile communication devices may be configured to communicate using multiple millimeter-wave, e.g., above 25 GHz, beams. For example, 5G devices may be configured to operate in the 28 GHz band (26.5-29.5 GHz) and the 39 GHz band (37-40 GHz). Millimeter-wave receive (Rx) beams may align with a transmit (Tx) beam of a 5G base station, that may be referred to as a gNodeB, or gNB, or a WLAN access point, or other source of communication signals. The receive beams may be from a Pseudo-Omni (PO) codebook (i.e., the range and granularity of steering angles), with a relatively large beamwidth, or may be from a narrow codebook, with a relatively small beamwidth. To form beams of varying beamwidths (e.g., narrower beamwidth for data transmission), different antenna array element types and arrangements may be used. By changing radiator array element weights (signal amplitudes and/or input feed signal phases), beams can be steered to various different scan angles and/or switched between a PO beam and a narrower beam.

SUMMARY

An example of an antenna system includes: a patch radiator being electrically conductive and configured to radiate energy in a first frequency band and a second frequency band, different from the first frequency band; a parasitic patch radiator overlapping with the patch radiator, the parasitic patch radiator being electrically conductive and being configured to radiate energy in the first frequency band; and at least one parasitic element including a conductor sized and disposed relative to the parasitic patch radiator such that a combination of the parasitic patch radiator and the at least one parasitic element will radiate energy in the second frequency band.

Implementations of such a system may include one or more of the following features. A lowest frequency in the first frequency band is at least 10% higher than a highest frequency in the second frequency band. The at least one parasitic element includes at least one conductor disposed adjacent to each edge of the parasitic patch radiator. The parasitic patch radiator is square, configured to radiate energy in the first frequency band in at least one of two orthogonal polarizations, and centered relative to the patch radiator, and the at least one parasitic element is symmetrically disposed and configured relative to the parasitic patch radiator such that the combination of the parasitic patch radiator and the at least one parasitic element will radiate energy in the second frequency band in at least one of the two orthogonal polarizations. The at least one parasitic element further includes a further conductor disposed is a region diagonally adjacent each corner of the parasitic patch radiator. The at least one parasitic element includes a conductive loop disposed around the parasitic patch radiator.

Also or alternatively, implementations of such a system may include one or more of the following features. The patch radiator is disposed in a first layer of the system, and the parasitic patch radiator and the at least one parasitic element are disposed in a second layer of the system, different from the first layer of the system. The parasitic patch radiator is a first parasitic patch radiator, the system further includes a second parasitic patch radiator disposed in a third layer of the system, the third layer being different from the first layer and the second layer, and the second parasitic patch radiator being configured to radiate energy in the second frequency band. The first parasitic patch radiator is disposed on a first side of the patch radiator and the second parasitic patch radiator is disposed on a second side, and overlapping with, the patch radiator. The system includes a plurality of parasitic elements, where the parasitic patch radiator and the plurality of parasitic elements are disposed symmetrically about a center point. The patch radiator is one of a plurality of patch radiators disposed in an array, the parasitic patch radiator and the at least one parasitic element are components of the array configured and disposed to parasitically couple to the plurality of patch radiators, and there are more parasitic patches than patch radiators in the array.

An example of a multi-layer antenna system includes: a multi-layered circuit board; a feed line configured to convey electricity; a patch radiator coupled to the feed line, the patch radiator being electrically conductive, having a rectangular shape, being disposed in a first layer of the multi-layered circuit board, and being configured to radiate energy in a first frequency band and a second frequency band different from the first frequency band; a parasitic patch radiator disposed in a second layer of the multi-layered circuit board, the patch radiator and the parasitic patch radiator overlapping, the parasitic patch radiator being electrically conductive, having a rectangular shape, having a first edge, a second edge, a third edge, and a fourth edge, each of the third edge and the fourth edge extending between the first edge and the second edge and having a first electrical length between 0.4 and 0.6 wavelengths, in a substrate of the multi-layered circuit board, in the first frequency band; and at least one parasitic element including a first conductor disposed adjacent to the first edge of the parasitic patch radiator and a second conductor disposed adjacent to the second edge of the parasitic patch radiator.

Implementations of such a system may include one or more of the following features. The parasitic patch radiator and the at least one parasitic element are disposed and configured to, in combination, provide an electrical length between 0.4 and 0.6 wavelengths in the substrate in the second frequency band to radiate energy in the second frequency band, a lowest frequency in the first frequency band being at least 10% higher than a highest frequency in the second frequency band. The parasitic patch radiator is square, the at least one parasitic element further includes a third conductor disposed adjacent to the third edge of the patch radiator and a fourth conductor disposed adjacent to the fourth edge of the patch radiator, the parasitic patch radiator, the first conductor, and the second conductor are configured to, in combination, radiate energy in the second frequency band in a first polarization, and the parasitic patch radiator, the third conductor, and the fourth conductor are configured to, in combination, radiate energy in the second frequency band in a second polarization orthogonal to the first polarization.

Also or alternatively, implementations of such a system may include one or more of the following features. The at least one parasitic element includes at least four conductive strips each disposed adjacent to a respective one of the first, second, third, and fourth edges of the parasitic patch radiator. The at least one parasitic element further includes square conductors each aligned with two of the four conductive strips.

Also or alternatively, implementations of such a system may include one or more of the following features. The at least one parasitic element includes a conductive ring disposed around the parasitic patch radiator. The parasitic patch radiator is a first parasitic patch radiator, and the system further includes a second parasitic patch radiator disposed in a third layer of the multi-layered circuit board and configured to radiate energy in the second frequency band. The at least one parasitic element is disposed in the second layer of the multi-layered circuit board.

Another example of an antenna system includes: a multi-layered circuit board; a feed line configured to convey electricity; a patch radiator coupled to the feed line, the patch radiator being electrically conductive, being disposed in a first layer of the multi-layered circuit board, and being configured to radiate energy at a first frequency and at a second frequency, the first frequency and the second frequency being separated by more than 5 GHz; and a plurality of parasitic patches disposed in a second layer of the multi-layered circuit board, the plurality of parasitic patches configured to receive first energy at the first frequency from the patch radiator and to re-radiate at least a portion of the first received energy at the first frequency, and configured to receive second energy at the second frequency from the patch radiator and to re-radiate at least a portion of the second received energy at the second frequency.

Implementations of such a system may include one or more of the following features. The plurality of parasitic patches are symmetric about a center point. The plurality of parasitic patches include four square patches each partially overlapping the patch radiator. The center point is a center point of the patch radiator. The first frequency is separated from the second frequency by approximately 11 GHz.

Another example of an antenna system includes: feed means for providing a first signal in a first frequency band and a second signal in a second frequency band; first radiating means, electrically coupled to the feed means, for radiating, in the first frequency band, the first signal received from the feed means, and for radiating, in the second frequency band, the second signal received from the feed means; second radiating means for parasitically receiving the first signal from the first radiating means and radiating, in the first frequency band, the first signal in the first frequency band; and third radiating means for parasitically receiving, in combination with the second radiating means, the second signal in the second frequency band and for radiating, in combination with the second radiating means, the second signal in the second frequency band.

Implementations of such a system may include one or more of the following features. The third radiating means are for parasitically receiving, in combination with the second radiating means, the second signal in the second frequency band from the first radiating means. A lowest frequency in the first frequency band is at least 10% higher than a highest frequency in the second frequency band. The second radiating means and the third radiating means are disposed in a first layer of a multi-layer circuit board. The system may include fourth radiating means for parasitically receiving the second signal in the second frequency band from the first radiating means and for radiating the second signal in the second frequency band, where the fourth radiating means are disposed in a second layer, different from the first layer, of the multi-layer circuit board. The second radiating means are for radiating the first signal in two orthogonal polarizations, and the third radiating means are symmetrically disposed about the second radiating means and are for, in combination with the second radiating means, radiating the second signal in the two orthogonal polarizations.

An example of a dual-band, dual-polarization antenna system includes: a multi-layered circuit board; a plurality of feed lines configured to convey electricity; a patch radiator coupled to the plurality of feed lines, the patch radiator being electrically conductive, having a square shape, being disposed in a first layer of the multi-layered circuit board, and shaped to radiate energy in a first frequency band of different polarizations in response to receiving energy in the first frequency band from the plurality of feed lines and shaped to radiate energy in a second frequency band of different polarizations in response to receiving energy in the second frequency band from the plurality of feed lines, the second frequency band being different from the first frequency band; a parasitic patch radiator disposed in a second layer of the multi-layered circuit board, the patch radiator and the parasitic patch radiator overlapping, the parasitic patch radiator being electrically conductive, and having a square shape with each edge having a length between 0.4 wavelengths and 0.6 wavelengths of energy in the first frequency band in the multi-layered circuit board; and at least one parasitic element disposed in the second layer of the multi-layered circuit board, the at least one parasitic element comprising conductive material disposed adjacent to at least two orthogonal edges of the patch radiator; where a cumulative length of the patch radiator and the at least one parasitic element, measured parallel to any edge of the parasitic patch radiator, is between 0.4 wavelengths and 0.6 wavelengths of energy in the second frequency band in the multi-layered circuit board.

Implementations of such a system may include one or more of the following features. A lowest frequency in the first frequency band is at least 10% higher than a highest frequency in the second frequency band. The at least one parasitic element includes at least four conductive strips each disposed adjacent to a respective edge of the parasitic patch radiator. The at least one parasitic element further includes square conductors each aligned with two of the four conductive strips.

DETAILED DESCRIPTION

Techniques are discussed herein for arranging non-radiating metal in a multi-layer antenna. For example, a patch antenna may be driven different frequency signals, and may be driven to radiate in multiple polarizations, e.g., two polarizations for each different frequency signal. For example, a patch antenna may be driven with a horizontal polarization signal (on H-pol feed) and a vertical polarization signal (on V-pol feed), both in a lower frequency (e.g., a 28 GHz band) and in a higher frequency (e.g., a 39 GHz band). The driven patch radiates energy in the lower frequency and the higher frequency in both polarizations, and at least the energy in the higher frequency couples to a parasitic patch radiator that is disposed in a different layer than the patch antenna and that overlaps the patch antenna. The parasitic patch radiator receives the energy of the higher frequency from the patch antenna and re-radiates the energy at the higher frequency. At least one parasitic element is configured (e.g., sized, shaped, etc.) and disposed to work in conjunction with the parasitic patch radiator to receive energy of the lower frequency from the patch antenna and re-radiate energy of the lower frequency. For example, the parasitic patch radiator may be resonant at the higher frequency and the parasitic patch radiator in combination with the at least one parasitic element is resonant at the lower frequency. Other configurations, however, may be used.

Items and/or techniques described herein may provide one or more of the following capabilities, as well as other capabilities not mentioned. Multiple bands of signals may be radiated using a compact antenna configuration, e.g., using a radiating patch antenna in conjunction with a parasitic patch radiator and at least one parasitic element. Signals in multiple millimeter-wave frequency bands may be radiated from a thin, multi-layered antenna structure. A parasitic patch radiator may be resonant in one frequency band and may form a portion of a radiator that is resonant in a different frequency band. Bandwidth may be broadened in one or more bands, e.g., in one or more millimeter-wave bands (e.g., 28 GHz band and 39 GHz band) compared to other antenna configurations. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

Figure 1:
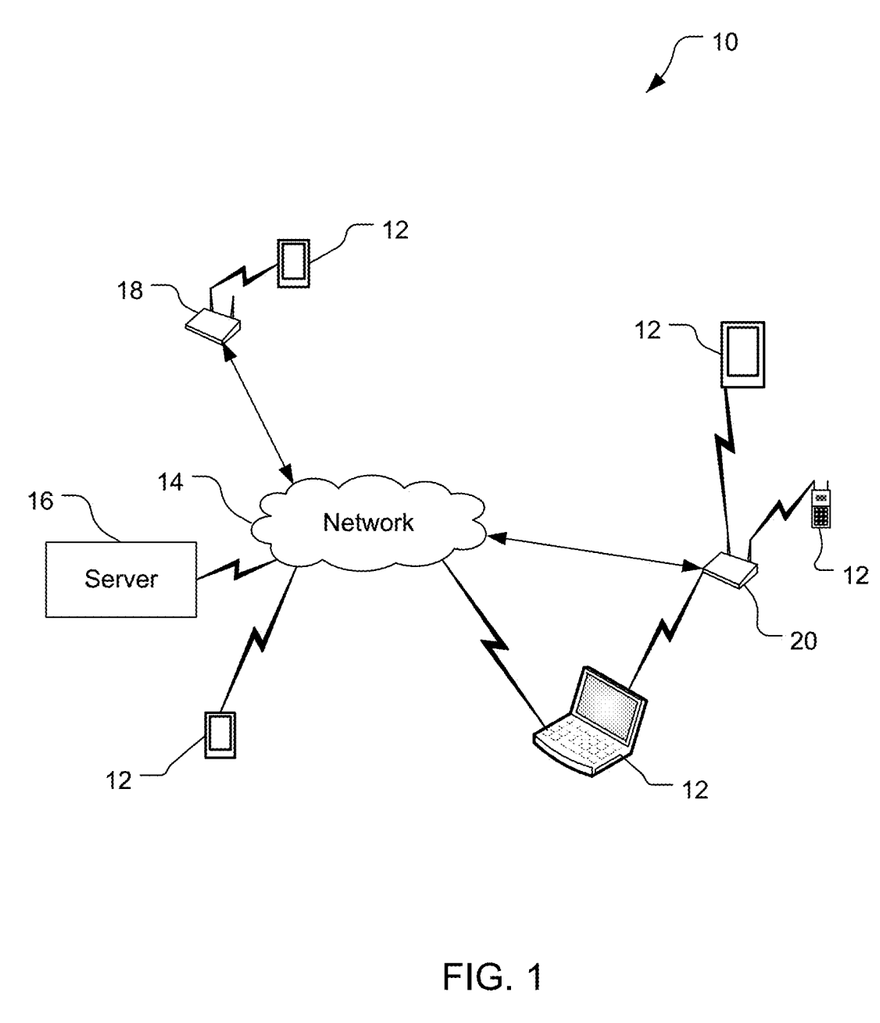
FIG. 1 is a schematic diagram of a communication system.

Referring to FIG. 1, a communication system 10 includes mobile devices 12, a network 14, a server 16, and access points (APs) 18, 20. The system 10 is a wireless communication system in that components of the system 10 can communicate with one another (at least some times using wireless connections) directly or indirectly, e.g., via the network 14 and/or one or more of the access points 18, 20 (and/or one or more other devices not shown, such as one or more base transceiver stations). For indirect communications, the communications may be altered during transmission from one entity to another, e.g., to alter header information of data packets, to change format, etc. The mobile devices 12 shown are mobile wireless communication devices (although they may communicate wirelessly and via wired connections) including mobile phones (including smartphones), a laptop computer, and a tablet computer. Still other mobile devices may be used, whether currently existing or developed in the future. Further, other wireless devices (whether mobile or not) may be implemented within the system 10 and may communicate with each other and/or with the mobile devices 12, network 14, server 16, and/or APs 18, 20. For example, such other devices may include internet of thing (IoT) devices, medical devices, home entertainment and/or automation devices, etc. The mobile devices 12 or other devices may be configured to communicate in different networks and/or for different purposes (e.g., 5G, Wi-Fi communication, multiple frequencies of Wi-Fi communication, satellite positioning, one or more types of cellular communications (e.g., GSM (Global System for Mobiles), CDMA (Code Division Multiple Access), LTE (Long-Term Evolution), etc.). The mobile device 12 is commonly referred to as a user equipment (UE) in UMTS (Universal Mobile Telecommunications System) applications, but may also be referred to as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

Figure 2:
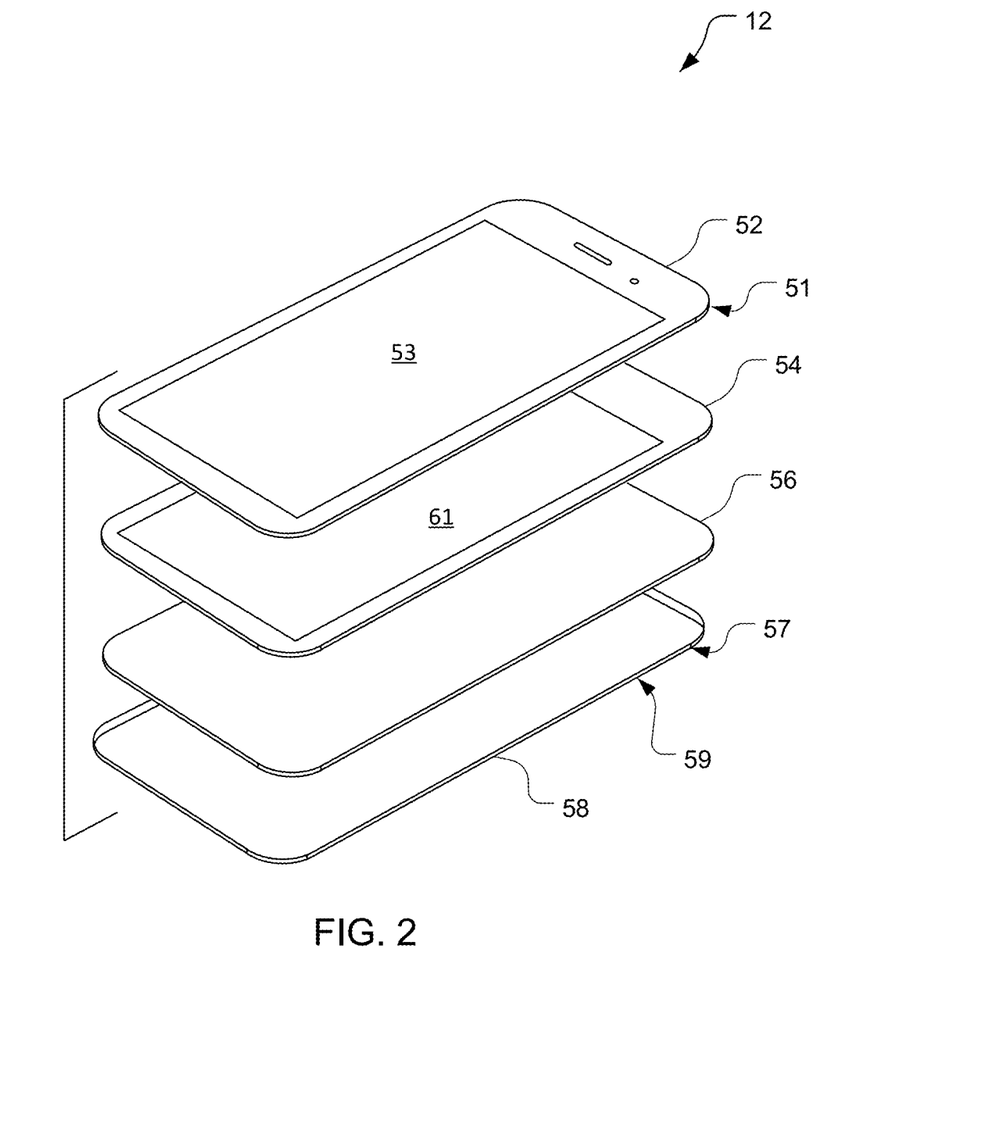
FIG. 2 is an exploded perspective view of simplified components of a mobile device shown in FIG. 1.

Referring to FIG. 2, an example of one of the mobile devices 12 shown in FIG. 1 includes a top cover 52, a display layer 54, a printed circuit board (PCB) layer 56, and a bottom cover 58. The mobile device 12 as shown may be a smartphone or a tablet computer but the discussion is not limited to such devices. The top cover 52 includes a screen 53. The PCB layer 56 includes one or more antennas configured to facilitate bi-directional communication between mobile device 12 and one or more other devices, including other wireless communication devices. The bottom cover 58 has a bottom surface 59 and sides 51, 57 of the top cover 52 and the bottom cover 58 provide an edge surface. The top cover 52 and the bottom cover 58 may comprise a housing that retains the display layer 54, the PCB layer 56, and other components of the mobile device 12 that may or may not be on the PCB layer 56. For example, the housing may retain (e.g., hold, contain) antenna systems, front-end circuits, an intermediate-frequency circuit, and a processor discussed below. Further, the size and/or shape of the PCB layer 56 may not be commensurate with the size and/or shape of either of the top or bottom covers or otherwise with a perimeter of the device. For example, the PCB layer 56 may have a cutout to accept a battery. Those of skill in the art will therefore understand that embodiments of the PCB layer 56 other than those illustrated may be implemented.

Figure 3:
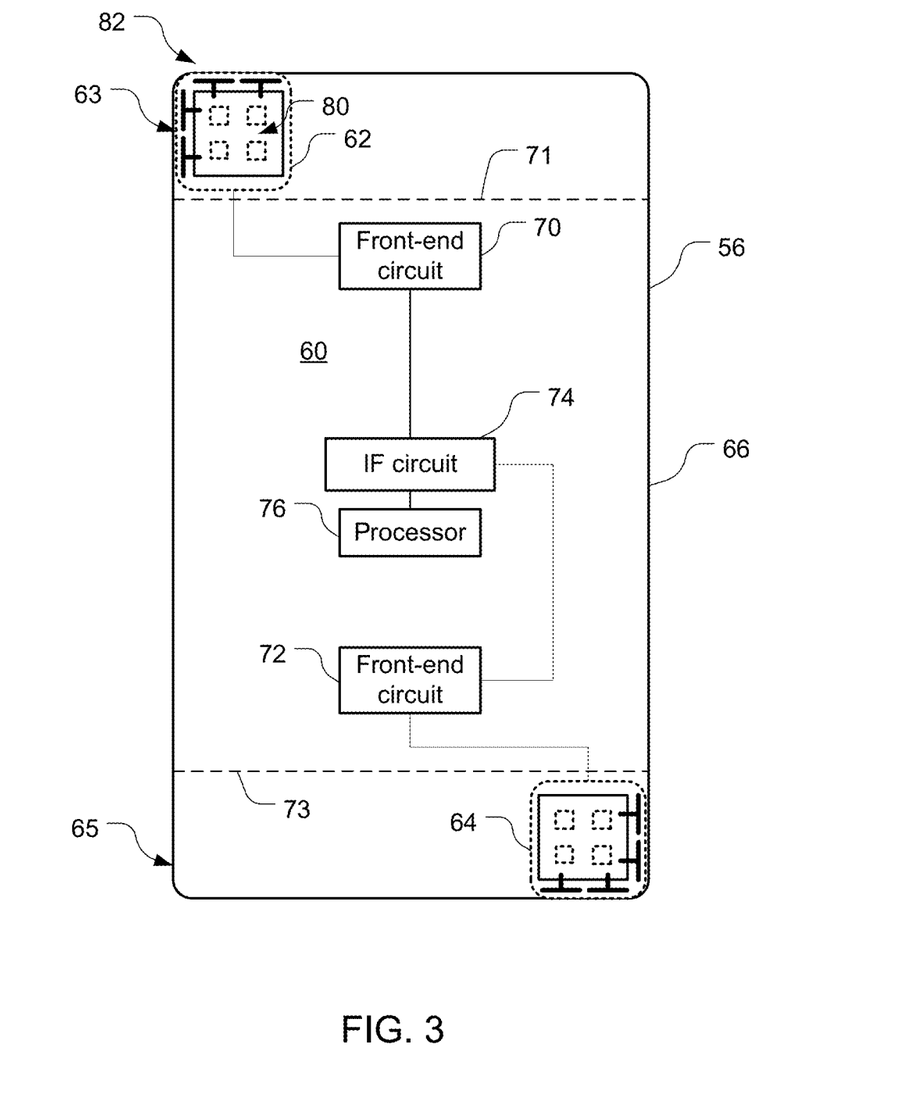
FIG. 3 is a top view of a printed circuit board, shown in FIG. 2, including antennas.

Referring also to FIG. 3, an example of the PCB layer 56 includes a main portion 60 and two antenna systems 62, 64. In the example shown, the antenna systems 62, 64 are disposed at opposite ends 63, 65 of the PCB layer 56, and thus, in this example, of the mobile device 12 (e.g., of the housing of the mobile device 12). The main portion 60 may comprise a PCB 66 that includes front-end circuits 70, 72 (also called a radio frequency (RF) circuit), an intermediate-frequency (IF) circuit 74, and a processor 76. The front-end circuits 70, 72 are configured to provide signals to be radiated to the antenna systems 62, 64 and to receive and process signals that are received by, and provided to the front-end circuits 70, 72 from, the antenna systems 62, 64. The front-end circuits 70, 72 are configured to convert received IF signals from the IF circuit 74 to RF signals (amplifying with a power amplifier as appropriate), and provide the RF signals to the antenna systems 62, 64 for radiation. The front-end circuits 70, 72 are configured to convert RF signals received by the antenna systems 62, 64 to IF signals (e.g., using a low-noise amplifier and a mixer) and to send the IF signals to the IF circuit 74. The IF circuit 74 is configured to convert IF signals received from the front-end circuits 70, 72 to baseband signals and to provide the baseband signals to the processor 76. The IF circuit 74 is also configured to convert baseband signals provided by the processor 76 to IF signals, and to provide the IF signals to the front-end circuits 70, 72. The processor 76 is communicatively coupled to the IF circuit 74, which is communicatively coupled to the front-end circuits 70, 72, which are communicatively coupled to the antenna systems 62, 64, respectively.

The antenna systems 62, 64 may be formed as part of the PCB layer 56 in a variety of manners. In FIG. 3, dashed lines 71, 73 separating the antenna systems 62, 64 from the PCB 66 indicate functional separation of the antenna systems 62, 64 (and the components thereof) from other portions of the PCB layer 56. The antenna systems 62, 64 may be integral with the PCB 66, being formed as integral components of the PCB 66 or may be separate from, but attached to, the PCB 66. Alternatively, one or more components of the antenna system 62 and/or the antenna system 64 may be formed integrally with the PCB 66, and one or more other components may be formed separate from the PCB 66 and mounted to the PCB 66, or otherwise made part of the PCB layer 56. Alternatively, each of the antenna systems 62, 64 may be formed separately from the PCB 66 and mounted to the PCB 66 and coupled to the front-end circuits 70, 72, respectively. In some embodiments, one or both of the front-end circuits 70, 72 are implemented with the antenna system 62 or 64 in a module and coupled to the PCB 66. For example, the module may be mounted to the PCB 66 or may be spaced from the PCB 66 and coupled thereto, for example using flexible cable or a flexible circuit. The antenna systems 62, 64 may be configured similarly to each other or differently from each other. For example, one or more components of either of the antenna systems 62, 64, may be omitted. As an example, the antenna system 62 may include 4G and 5G radiators while the antenna system 64 may not include (may omit) a 5G radiator. In other examples, an entire one of the antenna systems 62, 64 may be omitted or may be configured for use with a non-cellular technology such as a WLAN technology.

A display 61 (see FIG. 2) of the display layer 54 may roughly cover the same area as the PCB 66 and serve as a system ground plane for the antenna systems 62, 64 (and possibly other components of the device 12). The display 61 is disposed below the antenna system 62 and above the antenna system 64 (with "above" and "below" being relative to the mobile device 12, i.e., with a top of the mobile device 12 being above other components regardless of an orientation of the device 12 relative to the Earth).

The antenna systems 62, 64 may be configured to transmit and receive millimeter-wave energy. The antenna systems 62, 64 may be configured to steer to different scan angles and/or to change size of beamwidth, e.g., between a PO beam and a narrower beam.

Here, the antenna systems 62, 64 are configured similarly, with multiple radiators to facilitate communication with other devices at various directions relative to the mobile device 12. In the example of FIG. 3, the antenna system 62 includes an array 80 of patch radiator systems and an array 82 of dipole radiators. In other examples, one or more antenna systems may include one or more dipole radiators only, one or more patch radiators only, or a combination of one or more diploe radiators and one or more patch radiators. In other examples, one or more other types of radiators may be used alone or in combination with one or more dipole radiators and/or one or more patch radiators. The patch radiators are configured to radiate signals primarily to, and receive signals primarily from, above and below a plane of the PCB layer 56, i.e., into and out of the page showing FIG. 3. The dipole radiators are configured to radiate signals primarily to, and receive signals primarily from, sides of the PCB layer 56, with the dipole radiators in the antenna system 62 configured to radiate primarily to the top and left of the PCB layer 56 as shown in FIG. 3 and the dipole radiators in the antenna system 64 configured to radiate primarily to the right and bottom of the PCB layer 56 as shown in FIG. 3. Positioning the antenna systems 62, 64 in or near corners of the PCB layer 56 may help provide spatial diversity (directions relative to the mobile device 12 to which signals may be transmitted and from which signals may be received), e.g., to help increase MIMO (Multiple Input, Multiple Output) capability. Further, the array 82 of patch radiators may be configured to provide dual polarization radiation and reception.

Figure 4:
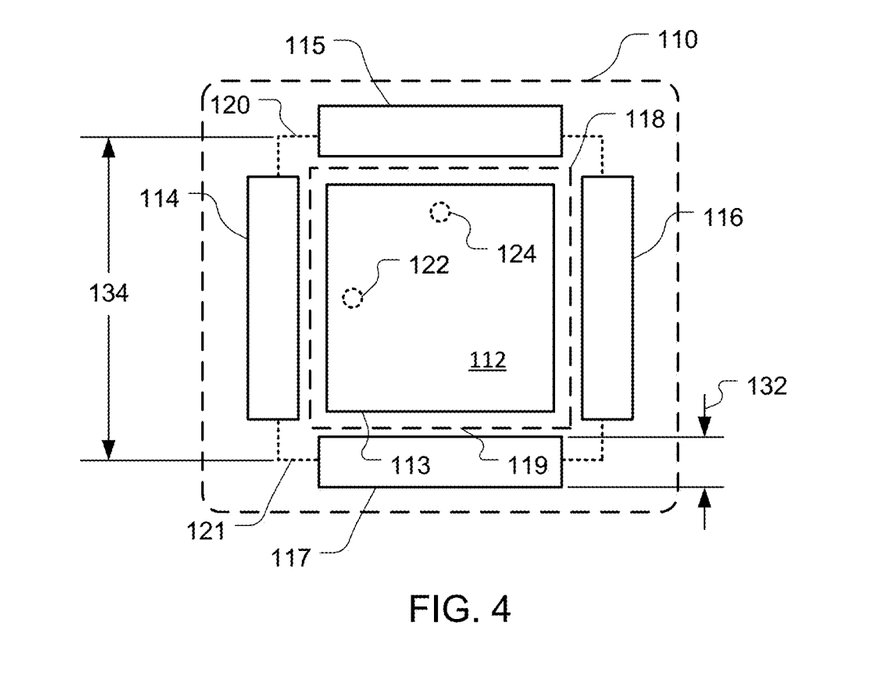
FIG. 4 is a top view of an example patch radiator system shown in FIG. 3.
Figure 5:
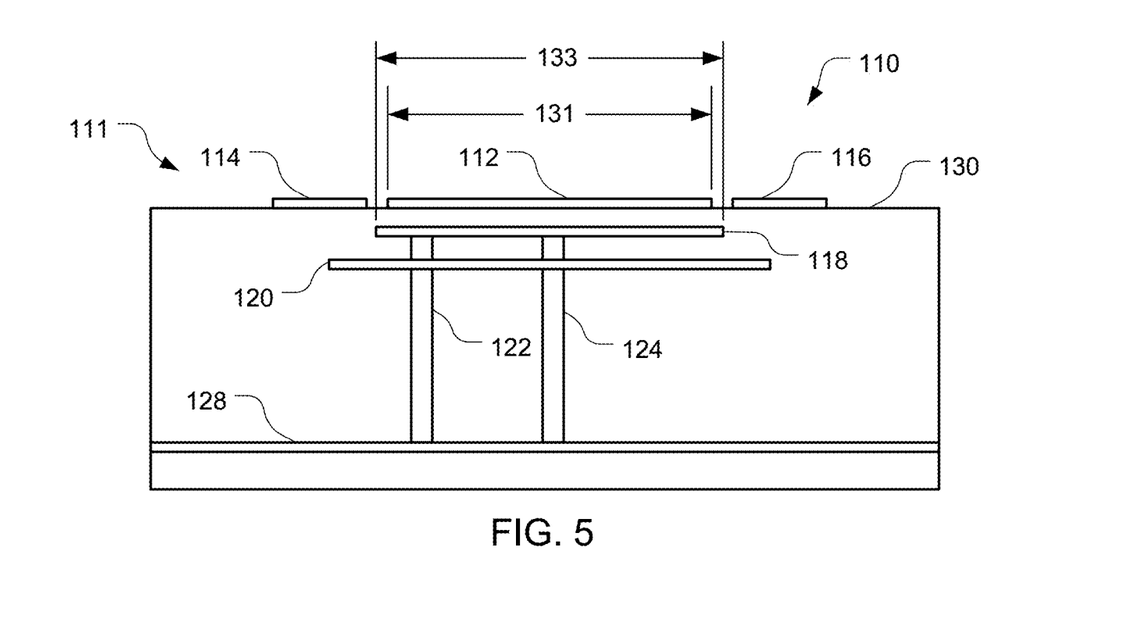
FIG. 5 is a side view of the patch radiator system shown in FIG. 4.

Referring also to FIGS. 4-5, an example of a patch radiator system 110, of the array 80 of patch radiator systems of the antenna system 62 shown in FIG. 3, is shown, with FIG. 4 being a top view of the system 110 and FIG. 5 being a side view of the system 110. The patch radiator system 110 includes a multi-layered circuit board 111 that includes a high-band patch 112, parasitic elements 114, 115, 116, 117, a radiating patch 118, a low-band patch 120, a horizontal polarization feed 122, a vertical polarization feed 124, a ground plane 128, and a substrate 130. The parasitic elements 114-117 may be considered as parasitic patches. The patch radiator system 110 is configured as a dual-band, dual-polarization radiator system. Being configured for dual-polarization radiation is not required, and one or more features in the system 110 may instead be configured to single-polarization radiation (e.g., a single feed may be used and/or one or more patches or other items sized and shaped for single polarization radiation at the frequency of signals to be transmitted and/or received). In the example shown, however, items are configured and provided for dual-polarization radiation. In particular, the system 110 may radiate in either or both of two orthogonal polarizations for two different 5G communication bands, e.g., due to orthogonal edges of radiators (e.g., patch radiators, parasitic radiators). For example, the system 110 may be configured to radiate in different, here orthogonal, polarizations in both the 28 GHz band and the 39 GHz band. In FIG. 5, the parasitic element 117 is not shown for clarity. The radiating patch 118, the low-band patch 120, and the ground plane 128 are disposed in different layers in the system within the substrate 130. The high-band patch 112 and the parasitic elements 114-117 are disposed in the same layer of the system 110, here, on top of the substrate 130. As shown in FIG. 5, with the system 110 oriented as shown, the high-band patch 112 is disposed above the radiating patch 118 (i.e., on a side of the patch 118 opposite the ground plane 128) and the low-band patch 120 is disposed below the radiating patch 118 (i.e., on the same side of the radiating patch 118 as the ground plane 128, such that the low-band patch 120 is disposed between the radiating patch 118 and the ground plane 128).

The feeds 122, 124 (also referred to as feed lines) are configured to convey electricity to provide signals to the radiating patch 118. Each of the feeds 122, 124 is configured to provide signals of different frequencies, here in the 28 GHz and 39 GHz band to the radiating patch 118. The feeds 122, 124 are electrically coupled to the radiating patch 118 in appropriate locations to excite the radiating patch 118 to radiate respective polarizations of signals in response to receiving signals from the feeds 122, 124. Here, the horizontal polarization feed 122 is coupled to the radiating patch 118 to excite the radiating patch 118 to radiate horizontally-polarized signals of frequencies corresponding to the frequencies of the energy of the signals provided by the feed 122. Also, the vertical polarization feed 124 is coupled to the radiating patch 118 to excite the radiating patch 118 to radiate vertically-polarized signals of frequencies corresponding to the frequencies of the energy of the signals provided by the feed 124. The feeds 122, 124 receive signals to be provided to the radiating patch 118 from transmission lines, e.g., striplines with the ground plane 128 being a top portion of the striplines (with remaining portions not shown). The feeds pass through, and do not make electrical contact with, the low-band patch 120.

The radiating patch 118 is electrically conductive (e.g., a conductor made of electrically conductive material), electrically coupled to the feeds 122, 124, and configured to radiate signals received from the feeds 122, 124. There may be some loss of some of the energy in a signal received from either of the feeds 122, 124 during transmission, but the radiating patch 118 will radiate sufficient energy to convey a signal corresponding to the information received, i.e., characteristics of the radiated signal will correspond to characteristics of the received signal. As shown, the radiating patch 118 is rectangular, here square, such that the radiating patch 118 may radiate signals in either or both of two orthogonal polarizations from respective edges of the radiating patch 118. The radiating patch 118 is sized to radiate energy in a high frequency band, e.g., and the 39 GHz band (37-40 GHz). For example, each edge of the radiating patch 118 may have an electrical length between 0.4 and 0.6 wavelengths, in the substrate 130, in the 39 GHz band. Here the edges of the radiating patch 118 are straight, but other configurations may be used (e.g., with slots extending inwardly from an otherwise straight edge). The radiating patch 118 is also configured to couple energy in a low frequency band, e.g., the 28 GHz band (26.5-29.5 GHz) to the low-band patch 120. A lowest frequency in the high frequency band may be at least 10% higher than a highest frequency in the low frequency band.

The high-band patch 112 is electrically conductive and configured and disposed to parasitically receive a high-band signal in a high frequency band and to re-radiate the high-band signal in the high frequency band (e.g., the 39 GHz band). The high-band patch 112 may be called a parasitic patch. The high-band patch 112 parasitically receives the high-band signal from the radiating patch 118 in that the high-band patch 112 wirelessly couples to and receives the high-band signal from energy radiated by the radiating patch 118. The high-band patch 112 re-radiates one or more signals in response to receiving the one or more signals from the radiating patch 118. The re-radiated high-band signal may have less energy than the received high-band signal but remains the same signal in content. The high-band patch 112 is disposed overlapping the radiating patch 118 to facilitate reception by the high-band patch 112 of the high-band signal radiated by the radiating patch 118. As shown, the high-band patch 112 is centered over the radiating patch 118, with edges 113 of the high-band patch 112 parallel with edges 119 of the radiating patch 118, and the entire high-band patch 112 overlaps the radiating patch 118, although other arrangements may be used (e.g., only partially overlapping the radiating patch 118, the edges 113 of the high-band patch 112 not parallel to the edges 119 of the patch 118, etc.). The high-band patch 112 is rectangular, here square, with edge lengths sized for radiating signals in the high band, e.g., in the 39 GHz band. The high-band patch 112 has edge lengths 131 that are slightly smaller than edge lengths 133 of the radiating patch 118, which may thus better (e.g., more efficiently) radiate signals in the high band than the radiating patch 118. The electrical length, here the edge length 131, of each edge of the high-band patch 112 may be between 0.4 and 0.6 wavelengths, in the substrate 130, of the frequencies in the high frequency band. Here, the edges of the high-band patch 112 are straight and thus the physical length corresponds to the electrical length. Other configurations, however, may be used, e.g., with one or more non-straight edges (e.g., with slots extending inwardly from an edge). Other examples of high-band patches may not be square, e.g., being rectangular but with two different edge lengths. This may facilitate radiation in different frequency bands.

The parasitic elements 114-117 are configured and disposed to parasitically receive a low-band signal in combination with the high-band patch 112. That is, the parasitic elements 114-117 are configured and disposed such that the combination of the high-band patch 112 and the parasitic elements 114-117 will parasitically receive the low-band signal (in a low frequency band) from the radiating patch 118. While four parasitic elements are shown, this is an example and other quantities (e.g., one, two, three, or more than four) of parasitic elements may be used. The combination of the high-band patch 112 and the parasitic elements 114-117 is configured to re-radiate the low-band signal in the low frequency band (e.g., the 28 GHz band). The combination of the high-band patch 112 and the parasitic elements 114-117 re-radiates one or more signals in response to receiving the one or more signals from the radiating patch 118. The combination of the high-band patch 112 and the parasitic elements 114-117 parasitically receives the low-band signal from the radiating patch 118 in that the high-band patch 112 and the parasitic elements 114-117 are not physically coupled to the radiating patch 118 (or either of the feeds 122, 124), but wirelessly couples to and receives the low-band signal from energy radiated by the radiating patch 118. The re-radiated low-band signal may have less energy than the received low-band signal but remains the same signal in content.

Each of the parasitic elements 114-117 is disposed adjacent to, i.e., near but a non-zero distance from, a corresponding edge of the high-band patch 112. An amount of separation between the high-band patch 112 and each of the parasitic elements 114-117 may be selected to provide desired performance of the system 110. The separation selected may be a tradeoff between low-band performance and high-band performance (e.g., return loss), with smaller separations increasing low-band performance and decreasing high-band performance and larger separations increasing high-band performance and decreasing low-band performance. In the example shown in FIGS. 4-5, the separation between the high-band patch 112 and the parasitic elements 114-117 is enough that the parasitic elements 114-117 do not overlap with the radiating patch 118, but is small enough that the parasitic elements 114-117 do overlap partially with the low-band patch 120. This separation is an example only and other separations may be used. The parasitic elements 114-117 are symmetrically disposed about the radiating patch 118 in the example shown in FIGS. 4-5. Also, in the example shown in FIGS. 4-5, the parasitic elements 114-117 have lengths that are slightly longer than the lengths of the corresponding edges of the high-band patch 112. Alternatively, the parasitic elements 114-117 could have the same lengths as the corresponding edges of the high-band patch 112, with ends of the parasitic elements 114-117 being collinear with respective edges of the high-band patch 112. In this example shown in FIGS. 4-5, the parasitic elements 114-117 are all separated from the high-band patch 112 by the same amount and have equal widths, although other configurations (e.g., unequal separations and/or unequal widths) could be used.

The parasitic elements 114-117 are sized and shaped to help parasitically receive and re-radiate signals in the low frequency band. Each of the parasitic elements 114-117 has an electrical width (in this example, a width 132) such that a combined distance of the electrical width (here, of the width 132) of two of the parasitic elements 114-117 and the electrical length (here, the length 131) of a corresponding edge of the high-band patch 112 between the two parasitic elements 114-117 is about half of a wavelength of the low-band signal. For example, this distance (here, a cumulative length of the length 131 plus twice the width 132) may be between 0.4 and 0.6 wavelengths, in the substrate 130, of the frequencies in the low frequency band.

The low-band patch 120 is configured and disposed to parasitically receive the low-band signal in the low frequency band and re-radiate the low-band signal in the low frequency band. The low-band patch 120 is thus a parasitic patch. The low-band patch 120 parasitically receives the low-band signal from the radiating patch 118 in that the low-band patch 120 is not conductively coupled to radiating patch 118 (or either of the feeds 122, 124), but wirelessly couples to and receives the low-band signal from energy radiated by the radiating patch 118. The re-radiated low-band signal from the low-band patch 120 may have less energy than the received low-band signal but remains the same signal in content. The re-radiated low-band signal from the low-band patch 120 may be received and re-radiated by the combination of the high-band patch 112 and the parasitic elements 114-117. The low-band patch 120 is disposed overlapping the radiating patch 118 to facilitate reception by the low-band patch 120 of the low-band signal radiated by the radiating patch 118. As shown, the low-band patch 120 is centered over the radiating patch 118, with edges 121 of the low-band patch 120 parallel with the edges 119 of the radiating patch 118, and the entire radiating patch 118 being overlapped by the low-band patch 120, although other arrangements may be used (e.g., only partially overlapping the radiating patch 118, the edges 121 of the low-band patch 120 not parallel to the edges 119 of the patch 118, etc.). In this example, the low-band patch 120 is rectangular, here square, with electrical edge lengths sized for radiating signals in the low band, e.g., in the 28 GHz band. The low-band patch 120 has electrical edge lengths, here edge lengths 134, that are longer than the electrical edge lengths, here the edge lengths 133, of the radiating patch 118, which may thus better (e.g., more efficiently) radiate signals in the low band than the radiating patch 118. The electrical edge length of each edge of the low-band patch 120 may be between 0.4 and 0.6 wavelengths, in the substrate 130, of the frequencies in the low frequency band. Other examples of low-band patches may not be square, e.g., being rectangular but with two different edge lengths. This may facilitate radiation in different frequency bands.

Other Configurations

The examples discussed above are non-exhaustive examples and numerous other configurations may be used. The discussion below is directed to some of such other configurations, but is not exhaustive either (by itself or when combined with the discussion above).

Figure 6:
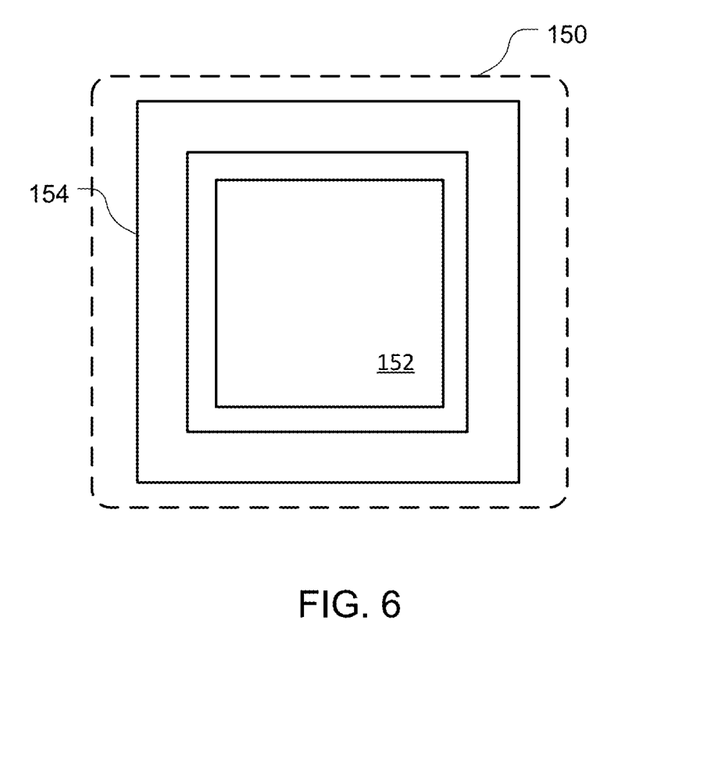
FIG. 6 is a top view of an alternative patch radiator system with a loop parasitic element.

Other configurations of parasitic elements or a parasitic element may be used. Referring to FIG. 6, an example of a patch radiator system 150, of the array 80 of patch radiator systems of the antenna system 62 shown in FIG. 3, includes a high-band patch 152 and a single parasitic element 154, with FIG. 6 being a top view of the system 150. The system 150 includes a radiating patch and may include other features (e.g., a low-band patch) similar to the system 110 shown in FIGS. 4-5), but these features are not shown in FIG. 6 for simplicity of the figure. The system 150 includes the single parasitic element 154 instead of the parasitic elements 114-117 shown in FIG. 4. The parasitic element 154 is a loop disposed around the high-band patch 152. Here, the loop is a square conductive ring although other shapes may be used.

Figure 7:
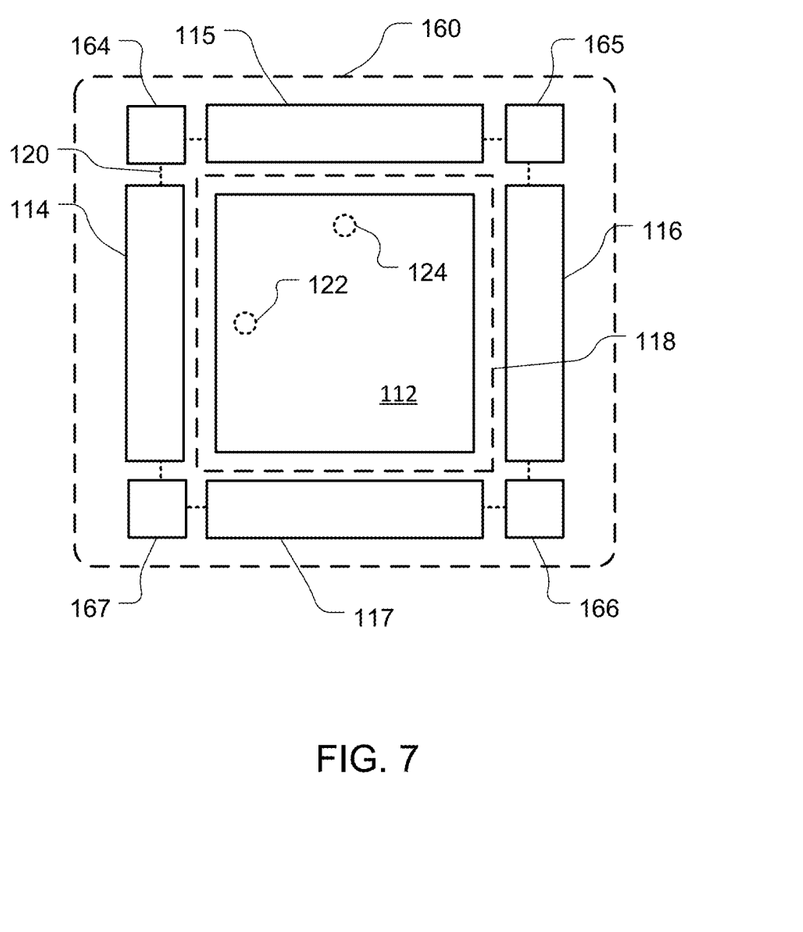
FIGS. 7-8 are top views of further alternative patch radiator systems with further parasitic elements.

Referring to FIG. 7, which is a top view, another example of a patch radiator system 160 includes the high-band patch 112, the parasitic elements 114, 115, 116, 117, the radiating patch 118, the low-band patch 120, the horizontal polarization feed 122, and the vertical polarization feed 124 as shown in FIG. 4, and also includes further parasitic elements 164, 165, 166, 167. The parasitic elements 164-167 are disposed diagonally adjacent to the high-band patch 112 in corners of the system 160, with each of the parasitic elements 164-167 aligned with two of the parasitic elements 114-117 that are, here, conductive strips. The use of the parasitic elements 164-167 may further improve radiation (e.g., lower insertion loss compared to not using the parasitic elements 164-167) by the system 160 in a lower frequency band, e.g., where a quarter wavelength in the lower frequency band is about equal to a width of the high-band patch 112 and two widths of one of the parasitic elements 114-117. In this example, the further parasitic elements 164-167 are square conductors. Using parasitic elements may also improve impedance match from the feeds into the radiating patch.

Figure 8:
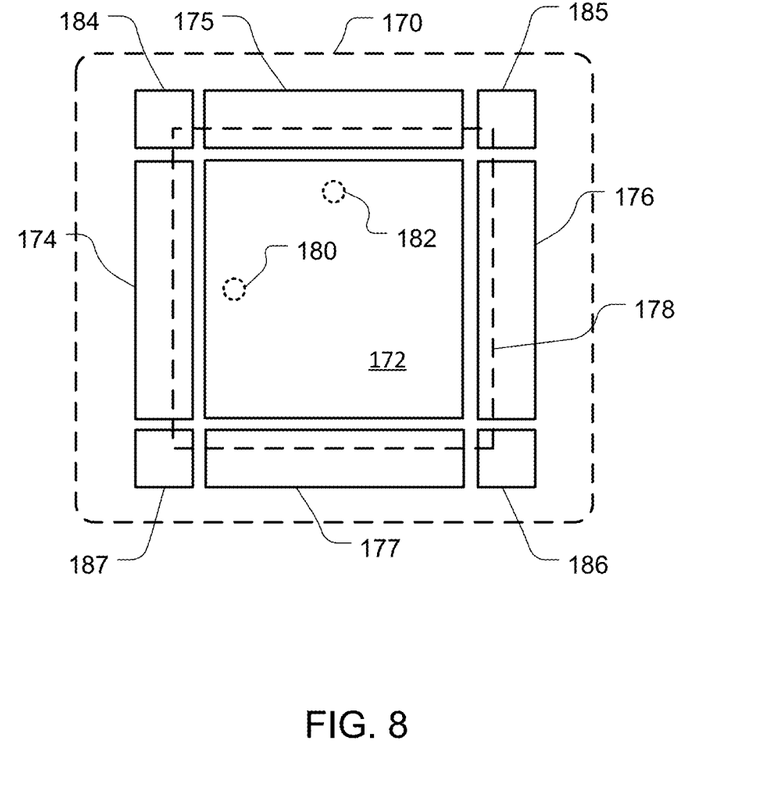

Referring to FIG. 8, which is a top view, another example of a patch radiator system 170 includes a parasitic patch 172, parasitic elements 174, 175, 176, 177, a radiating patch 178, a horizontal polarization feed 180, a vertical polarization feed 182, and further parasitic elements 184, 185, 186, 187. In this example, the parasitic elements 174-177 are conductive strips each disposed in close proximity with a respective edge of the parasitic patch 172 and each having a length similar (here, equal) to the length of the respective edge of the parasitic patch 172. Each of the parasitic elements 184-187 is disposed in a respective corner of the system 170 and aligned with a respective pair of the parasitic elements 174-177. The parasitic patch 172 is smaller than the radiating patch 178. The radiating patch 178 completely overlaps the parasitic patch 172, partially overlaps each of the parasitic elements 174-177, and partially overlaps each of the parasitic elements 184-187. The parasitic patch 172 is sized to radiate energy primarily in a desired frequency band (e.g., has electrical edge lengths between 0.4 wavelengths and 0.6 wavelengths, in a substrate of the system 170, of frequencies in the desired frequency band). The parasitic elements 174-177, 184-187 are sized, shaped, and disposed such that a combination of the parasitic patch 172 and the parasitic elements 174-177, 184-187 re-radiate energy received from the radiating patch 178 primarily in the desired frequency band.

Still other configurations are possible. For example, in the patch radiator system 170, and/or in other configurations, a low-band patch (such as the low-band patch 120 shown in FIGS. 4-5) may be omitted.

Figure 9:
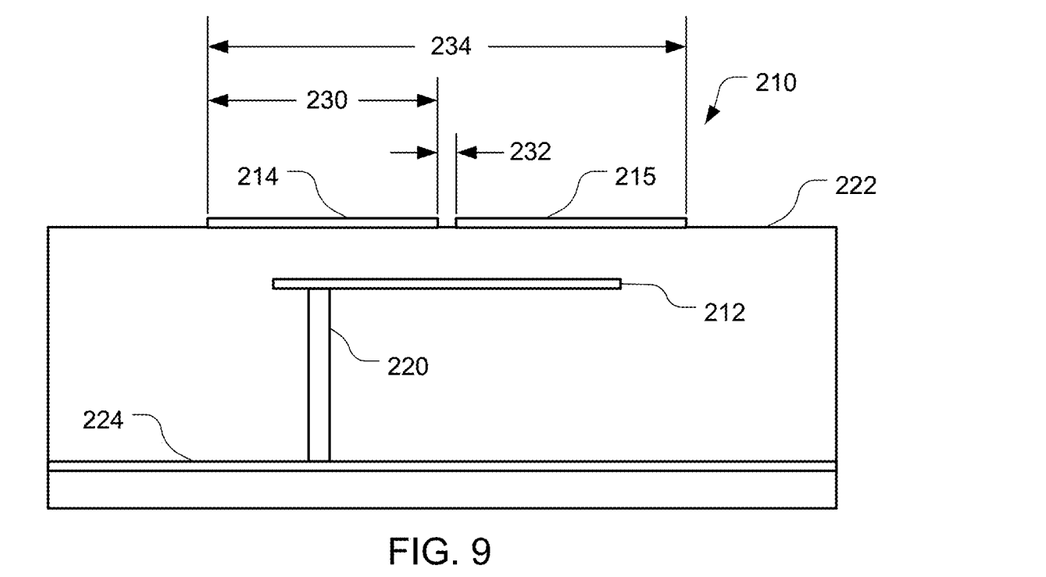
FIG. 9 is a side view of another example patch radiator system.
Figure 10:
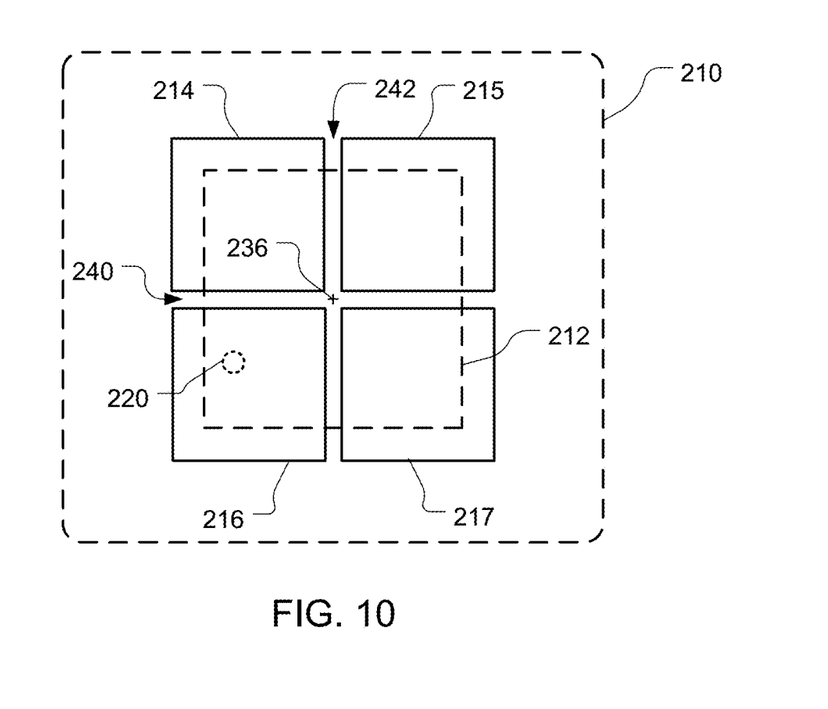
FIG. 10 is a top view of the patch radiator system shown in FIG. 9.

Referring to FIGS. 9 and 10, which are side and top views, respectively, another example of a patch radiator system 210 includes a radiating patch 212, parasitic patches 214, 215, 216, 217, a feed 220, a substrate 222, and a ground plane 224. In this example, the radiating patch 212 may be configured to radiate signals, provided through the feed 220, of multiple frequency bands or of multiple frequencies across a wide band, for example a band of 5 GHz or more (e.g., 11 GHz). Here, each of the parasitic patches 214-217 is square, and there are four parasitic patches, although other shapes (e.g., non-square rectangles, hexagons, etc.) and/or quantities of parasitic patches may be used. The parasitic patches 214-217 are configured (e.g., sized and shaped) and disposed to parasitically receive signals from the radiating patch 212 and to re-radiate energy in the multiple frequency bands.

In an example, the patch radiator system 210 is configured to radiate signals of multiple frequency bands and each of the parasitic patches 214-217 may have a length 230 (and width) of a length to facilitate radiation at a higher frequency band, e.g., above 50 GHz such as in a 60 GHz band. For example, the length 230 may be about a half of a wavelength (e.g., between 0.4 and 0.6 wavelengths) of a higher frequency signal fed to and radiated by the radiating patch 212. Each of the parasitic patches 214-217 may be separated from adjacent ones of the parasitic patches 214-217 by a gap length 232 such that an array length 234 of adjacent ones of the parasitic patches 214-217 and the gap length 232 is of a length that facilitates radiation of signals of a lower frequency, e.g., in the 28 GHz band. For example, the array length 234 may be about a half of a wavelength (e.g., between 0.4 and 0.6 wavelengths) of a lower frequency signal fed to and radiated by the radiating patch 212. The gap length 232 is sized such that adjacent ones of the parasitic patches 214-217 can operate in combination to radiate lower-frequency signals while permitting individual ones of the parasitic patches to radiate higher-frequency signals. As shown, the parasitic patches are disposed overlapping the patch radiator 212, centered over the patch radiator 212, and symmetrically disposed about a center point 236, which is also the center point of the patch radiator 212. The radiating patch 212 may similarly be configured to radiate in the higher and lower frequency bands, for example being sized as a multiple or fraction of a plurality of wavelengths of signals for transmission or reception.

In another example, the parasitic patches are configured to re-radiate energy over a wide frequency band. For example, the parasitic patches 214-217 may be sized to re-radiate energy over a frequency band from 28 GHz to 39 GHz or from 57 GHz to 68 GHz, e.g., with a return loss below a threshold return loss (e.g., −5 dB, or −10 dB) over the band. The size of the parasitic patches 214-217 and the gaps 240, 242 between the parasitic patches 214-217 may be adjusted to affect radiation by the parasitic patches 214-217, e.g., return loss as a function of frequency. For example, sizes of the gaps 240, 242 may affect the amount of radiation as a function of frequency and the patch radiator system 210 may be configured to effectively radiate signals over a frequency band of 11 GHz or more. In some such embodiments, rather than each individual parasitic patch being configured to radiate a signal at the lower end of the frequency band, two or more of the parasitic patches 214-217 may be configured to radiate at all of the frequencies in the band in combination.

Figure 11:
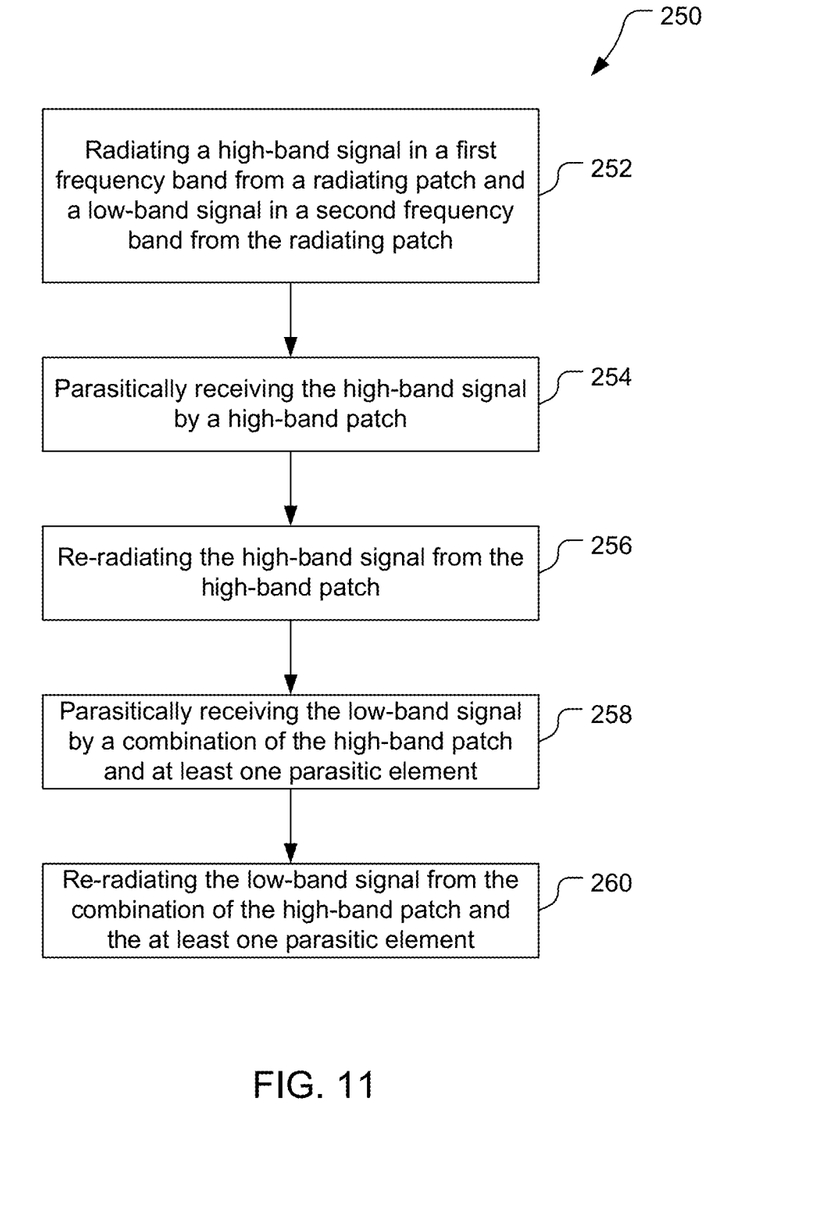
FIG. 11 is a block flow diagram of a method of parasitically receiving and re-radiating signals of different frequency bands.

Referring to FIG. 11, with further reference to FIGS. 1-10, a method 250 of parasitically receiving and re-radiating signals of different frequency bands includes the stages shown. The method 250 is, however, an example only and not limiting. The method 250 may be altered, e.g., by having stages added, removed, rearranged, combined, performed concurrently, and/or having single stages split into multiple stages. For example, stages 254 and 256 may be performed before, after, or concurrently with stages 258 and 260, e.g., for use generally or for use in carrier-aggregation techniques. Still other alterations to the method 250 as shown and described are possible.

At stage 252, the method 250 includes radiating a high-band signal in a first frequency band from a radiating patch and a low-band signal in a second frequency band from the radiating patch. For example, the feeds 122, 124 may convey respective high-band signals to the radiating patch 118 that radiates the high-band signals from the feeds 122, 124 in respective polarizations. As another example, only one of the feeds 122, 124 may convey a high-band signal to the radiating patch 118. As another example, one of the feeds 122, 124 may convey a high-band signal to the radiating patch 118 while the other of the feeds 122, 124 may concurrently convey a low-band signal to the radiating patch 118. As another example, the feeds 122, 124 may convey low-band signals to the radiating patch 118 that radiates the low-band signals from the feeds 122, 124 in respective polarizations. As another example, only one of the feeds 122, 124 may convey a low-band signal to the radiating patch 118. The high-band signals and the low-band signals will typically be provided to the feeds 122, 124 at different times, and the feeds 122, 124 will each typically be fed only one signal at a time, but different signals may be provided to either of the feeds 122, 124 concurrently. The signals conveyed to the radiating patch 118 by the feeds 122, 124 may be the same signals or may be different signals (e.g., have different content), even if the signals are of the same frequency band.

At stage 254, the method 250 includes parasitically receiving the high-band signal by a high-band patch. For example, energy of the high-band signal radiated by the radiating patch 118 may be received by the high-band patch 112. As the high-band patch 112 receives the high-band signal wirelessly, the high-band patch 112 parasitically receives the high-band signal. The high-band patch 112 receives the high-band signal even though the high-band patch 112 receives less than all of the energy of the high-band signal radiated by the radiating patch 118.

At stage 256, the method 250 includes re-radiating the high-band signal from the high-band patch. For example, the high-band patch 112 radiates energy due to receiving the high-band signal, and thus re-radiates the high-band signal although the high-band patch 112 radiates less than all of the energy of the high-band signal that the high-band patch 112 received from the radiating patch 118. The high-band patch 112 is configured (e.g., shaped and arranged) to re-radiate high-band energy in each of the high-band polarizations radiated by the radiating patch 118. As other examples, the high-band patch 152 or the parasitic patch 172 re-radiates high-band signal energy received from the radiating patch 118.

At stage 258, the method 250 includes parasitically receiving the low-band signal by a combination of the high-band patch and at least one parasitic element. For example, energy of the low-band signal radiated by the radiating patch 118 may be received by the high-band patch 112 and the parasitic elements 114-117, or a combination of the high-band patch 152 and the parasitic element 154, or a combination of the high-band patch 112, and the parasitic elements 114-117 and 164-167, or a combination of the parasitic patch 172 and the parasitic elements 174-177 and 184-187. Other examples of combinations of patch and parasitic element(s) may be used. As the high-band patch 112 and the parasitic elements 114-117 receive the low-band signal wirelessly, the high-band patch 112 and the parasitic elements 114-117 parasitically receive the low-band signal. The combination of the high-band patch 112 and the parasitic elements 114-117 receives the low-band signal even though the combination of the high-band patch 112 and the parasitic elements 114-117 receives less than all of the energy of the low-band signal radiated by the radiating patch 118.

At stage 260, the method 250 includes re-radiating the low-band signal from the combination of the high-band patch and the at least one parasitic element. For example, the high-band patch 112 in combination with the parasitic elements 114-117 may radiate energy due to receiving the low-band signal, and thus re-radiates the low-band signal although the combination of the high-band patch 112 and the parasitic elements 114-117 radiates less than all of the energy of the low-band signal received from the radiating patch 118. If only one low-band signal is received from the radiating patch 118, then less than all of the parasitic elements 114-117 (i.e., only the parasitic elements 114-117 corresponding to the polarization of the received signal) may re-radiate energy of the low-band signal. The high-band patch 112 in combination with the parasitic elements 114-117 is configured (e.g., shaped and arranged) to re-radiate low-band energy in each of the low-band polarizations radiated by the radiating patch 118. As other examples, the high-band patch 152 in combination with the parasitic element 154, or the high-band patch 112 in combination with the parasitic elements 114-117 and the further parasitic elements 164-167, or the combination of the parasitic patch 172 and the parasitic elements 174-177 and 184-187 re-radiates each of the low-band signals received from the radiating patch 118, in corresponding polarizations.

Other Considerations

The techniques and discussed above are examples, and not exhaustive. Configurations other than those discussed may be used.

As used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Further, more than one invention may be disclosed.

The invention claimed is:

1. A patch radiator system, comprising:
   a circuit board comprising a plurality of layers, wherein none of the plurality of layers are coplanar;
   a patch radiator disposed in a first layer of the plurality of layers, the patch radiator having a first edge having a first length and a second edge having a second length, the second edge being approximately orthogonal to the first edge;
   a first feed configured to convey signals in a first frequency and a second frequency to and from the patch radiator, the first feed coupled to the patch radiator to cause radiation in a first polarization;
   a second feed configured to convey signals in the first frequency and the second frequency to and from the patch radiator, the second feed coupled to the patch radiator to cause radiation in a second polarization, the second frequency being different from the first frequency;
   a parasitic patch radiator disposed in a second layer of the plurality of layers, the parasitic patch radiator overlapping with the patch radiator and being electrically conductive; and
   a plurality of parasitic elements disposed in a third layer of the plurality of layers, each parasitic element of the plurality of parasitic elements being electrically conductive and having a width shorter than the first length and the second length.

2. The system of claim 1, wherein each parasitic element of the plurality of parasitic elements comprises a conductive strip.

3. The system of claim 2, wherein a length of each parasitic element of the plurality of parasitic elements is greater than 0.4 wavelengths of the second frequency, and the width of each parasitic element of the plurality of parasitic elements is less than one sixth of a wavelength of the first frequency.

4. The system of claim 3, wherein the second frequency is higher than the first frequency.

5. The system of claim 2, wherein each parasitic element of the plurality of parasitic elements has a length shorter than the first length and the second length.

6. The system of claim 2, the parasitic patch radiator having a third edge having a third length and a fourth edge having a fourth length, the third edge being approximately orthogonal to the fourth edge, wherein each parasitic element of the plurality of parasitic elements has a length shorter than the third length and the fourth length.

7. The system of claim 1, wherein the plurality of parasitic elements comprises four parasitic elements having approximately the same dimensions and shape.

8. The system of claim 7, wherein the four parasitic elements are symmetrically disposed about the patch radiator.

9. The system of claim 8, wherein the parasitic patch radiator is centered relative to the patch radiator.

10. The system of claim 9, wherein the parasitic patch radiator and the patch radiator are approximately square.

11. The system of claim 1, wherein a portion of each parasitic element of the plurality of parasitic elements overhangs the patch radiator, and another portion of each parasitic element of the plurality of parasitic elements does not overhang the patch radiator.

12. The system of claim 1, wherein no portion of any of the plurality of parasitic elements overhangs the patch radiator.

13. The system of claim 1, further comprising a ground plane disposed in a fourth layer of the plurality of layers.

14. The system of claim 13, wherein the first layer is between the third layer and the fourth layer.

15. The system of claim 1, wherein the first frequency and the second frequency are in different millimeter-wave bands.

16. The system of claim 1, wherein the first frequency is in a first 5G communication band and the second frequency is in a second 5G communication band different form the first 5G communication band.

17. The system of claim 16, wherein the first frequency is approximately 26.5 GHz.

18. The system of claim 16, wherein the second frequency is approximately 28 GHz.

19. The system of claim 1, wherein the second polarization is orthogonal to the first polarization.

20. The system of claim 1, wherein the first feed and the second feed are directly connected to the patch radiator.

21. The system of claim 1, wherein the patch radiator system is included in an antenna system in a smartphone having a printed circuit board (PCB), the antenna system being mounted to the PCB, the PCB including an intermediate frequency circuit.

22. The system of claim 1, wherein the patch radiator system is included in an antenna system comprising an array of patch radiator systems, each patch radiator system in the array of patch radiator systems comprising a patch radiator, a first feed, a second feed, a parasitic patch radiator, and a plurality of parasitic elements.

23. The system of claim 22, wherein there are four patch radiator systems in the array of patch radiator systems.

24. The system of claim 23, wherein the antenna system further comprises an array of four other antennas.

* * * * *